(12) United States Patent
Klemens

(10) Patent No.: US 6,345,219 B1
(45) Date of Patent: Feb. 5, 2002

(54) OCCUPANT PROTECTION CONTROL SYSTEM AND METHOD OF CONTROLLING THE OCCUPANT PROTECTION CONTROL SYSTEM

(75) Inventor: Paul Klemens, Obertraubling (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/444,960

(22) Filed: Nov. 22, 1999

Related U.S. Application Data

(63) Continuation of application No. PCT/DE98/01166, filed on Apr. 27, 1998.

(30) Foreign Application Priority Data

May 21, 1997 (DE) .......................................... 197 21 303

(51) Int. Cl.$^7$ .......................... B60R 21/32; G06F 17/00
(52) U.S. Cl. .......................... 701/45; 701/29; 340/471; 280/734
(58) Field of Search ........................... 701/215, 29, 36, 701/33, 47; 340/471, 472; 180/282; 280/728.1, 734, 735

(56) References Cited

U.S. PATENT DOCUMENTS

| | | | | |
|---|---|---|---|---|
| 3,750,103 A | * | 7/1973 | Angus et al. | 340/153 R |
| 3,760,416 A | * | 9/1973 | Barriere et al. | 343/7 ED |
| 3,894,218 A | * | 7/1975 | Weissler | 235/150.3 |
| 4,130,095 A | * | 12/1978 | Bowler et al. | 123/32 EE |
| 5,351,185 A | * | 9/1994 | Takeuchi et al. | 364/184 |
| 5,372,213 A | * | 12/1994 | Hasebe et al. | 180/65.6 |
| 5,638,274 A | * | 6/1997 | Konishi et al. | 364/424.055 |
| 5,683,103 A | * | 11/1997 | Blackburn et al. | 280/735 |
| 5,746,444 A | * | 5/1998 | Foo et al. | 280/735 |
| 5,787,377 A | * | 7/1998 | Watanabe et al. | 701/45 |
| 5,802,480 A | * | 9/1998 | Shiraishi | 701/45 |
| 5,890,085 A | * | 3/1999 | Corrado et al. | 701/47 |
| 5,899,946 A | * | 5/1999 | Iyoda | 701/20 |
| 5,899,948 A | * | 5/1999 | Raphael et al. | 701/45 |
| 5,916,289 A | * | 6/1999 | Fayyad et al. | 701/45 |
| 5,956,703 A | * | 9/1999 | Turner et al. | 706/27 |
| 5,957,985 A | * | 9/1999 | Wong et al. | 701/33 |

FOREIGN PATENT DOCUMENTS

| | | |
|---|---|---|
| DE | 19509711 A1 | 9/1995 |
| EP | 0649777 A1 | 4/1995 |
| EP | 0693404 A2 | 1/1996 |
| JP | 11-64649 | 6/1989 |

* cited by examiner

*Primary Examiner*—Tan Nguyen
*Assistant Examiner*—Dalena Tran
(74) *Attorney, Agent, or Firm*—Herbert L. Lerner; Laurence A. Greenberg; Werner H. Stemer

(57) ABSTRACT

An occupant protection control system has two occupant protection control devices, in particular a front airbag control device and a side airbag control device. One occupant protection control device contains in addition to a non-volatile memory a further memory, in which the sensor data of the other occupant protection control system, emitted by the other occupant protection control device and monitored for the sensing of a possible accident, are continuously recorded. When an accident is sensed, the data are re-stored from the further memory into the non-volatile memory, in which the accident-relevant data sensed by the other occupant protection control device are also permanently stored.

3 Claims, 1 Drawing Sheet

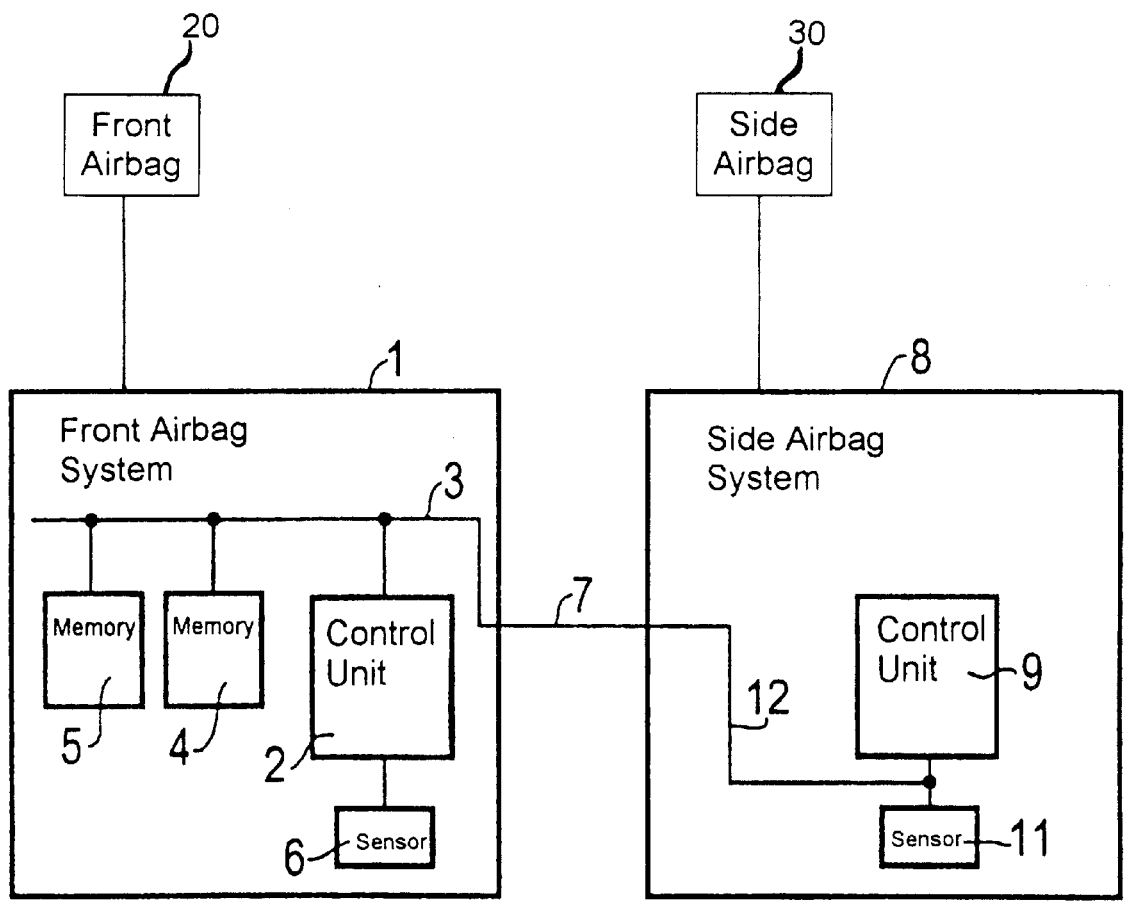

OCCUPANT PROTECTION CONTROL SYSTEM AND METHOD OF CONTROLLING THE OCCUPANT PROTECTION CONTROL SYSTEM

CROSS-REFERENCE TO RELATED APPLICATION

This is a continuation of copending International Application PCT/DE98/01166, filed Apr. 27, 1998, which designated the United States.

BACKGROUND OF THE INVENTION

Field of the Invention

The invention concerns an occupant protection control system with at least two occupant protection control devices for controlling two or more occupant protection systems in a vehicle. The invention is directed in particular at an occupant protection control system including at least two airbags, but also for occupant protection systems of other types, for example rollover bar and/or belt pre-load systems.

For triggering the occupant protection system in the event of an accident, the output signals emitted by crash sensors are continuously monitored. In the event of abrupt changes of the output signals, signaling an accident, the occupant protection system, in particular an airbag, is activated. At the same time, the output signals emitted by the crash sensors are registered in a non-volatile memory, so that an accident data recorder is provided. The output signals reproduce in particular the speed profile and the decelerations of the vehicle for a certain period of time before the instant of the accident until the accident itself, but may also include further data essential for the way in which the accident happened, and consequently for its reconstruction, such as for instance the lateral acceleration of the vehicle.

If a plurality of occupant protection systems, for example a front airbag and a side airbag, are present, each of the control devices of these occupant protection systems may contain its own non-volatile memory, in which in the event of an accident the accident-related parameters measured by the control device such as speed and deceleration are stored independently. This allows a better reconstruction of the way in which the accident happened, since accident-relevant parameters measured by various control devices are then stored independently of one another and consequently additional statements concerning the events immediately before the accident are provided. However, here there arises the problem of correlating the crash recordings on a time basis during the later attempt at reconstruction, since it may not be possible to reconstruct the respective points in time of the data recordings with certainty and it is consequently problematical to assign a time to the accident-relevant data stored in the separate control devices. Furthermore, in this case each control device is provided with a non-volatile memory, which increases the outlay in terms of hardware.

Published, European Patent Application EP 0 693 404 A2 discloses an occupant protection control system having a central control device, which is equipped with a centrally disposed collision sensor and with memories (RAM, ROM, EEPROM). There are also side collision sensors, the output signals of which are subjected to a threshold value comparison. The digital comparison result data are likewise applied to the central control device, which takes the triggering decisions in dependence on the respective sensor signal states. The occupant protection control system contains driver and passenger airbags, side airbags and belt pre-load devices, which are all controlled by the central control device.

Published, European Patent Application EP 0 649 777 A1 is directed at an occupant protection control system which is equipped with a single central control device with RAM, ROM, EEPROM. The central control device receives not only acceleration sensor signals, but also further operating parameters such as ABS activation, brake and accelerator pedal actuation etc., and controls occupant protection systems such as belt pre-load devices, front and side airbags. The control device is equipped with a circulating memory, in which the acceleration sensor data and further operating parameter data, supplied on the vehicle bus, are stored for a certain time period before and after a triggering event. An accident data recorder function is consequently provided.

SUMMARY OF THE INVENTION

It is accordingly an object of the invention to provide an occupant protection control system and a method of controlling the occupant protection control system which overcome the above-mentioned disadvantages of the prior art devices and methods of this general type, which permit a novel form of storage of accident-related data facilitating accident data evaluation.

With the foregoing and other objects in view there is provided, in accordance with the invention, an occupant protection control system, including at least two occupant protection control devices for controlling at least two occupant protection devices disposed in a vehicle. One of the at least two occupant protection control devices has a control unit, a non-volatile memory for permanent storage of accident-related signals in an event of an accident, and a volatile memory. The volatile memory storing data sensed and supplied by the other of the at least two occupant control devices. In the event of the accident, the control unit initiates and controls a re-storage of the data stored in the volatile memory into the non-volatile memory.

In the case of the invention, in one control device there is further stored the data relevant for a possible accident determined by another control device. For this purpose, in addition to the non-volatile memory of the control device there is a further, volatile memory, in which the signals generated by the sensor or sensors of the other control device are stored. In the event of an accident, there takes place not only a storage of the accident-relevant data determined by the control device containing the non-volatile memory in the non-volatile memory but also a re-storage of the accident-relevant data determined by the other control device and stored in the further, volatile memory into the non-volatile memory. Since the accident-relevant data of the two control devices then stored in the non-volatile memory in each case reproduce the same time interval and consequently are correlated in time with certainty, the later reconstruction of the way in which the accident happened is unproblematical and can be performed on the basis of the multiplicity of data available (from at least two control devices) with a high degree of precision of the statements made. Furthermore, it is not necessary to equip the further control device with a non-volatile memory of its own, so that the outlay in terms of hardware required for this control device is reduced.

With the foregoing and other objects in view there is further provided, in accordance with the invention, a method of controlling an occupant protection control system having at least two occupant protection control devices, which includes:

storing accident-relevant data of a first control device in a non-volatile memory of the first control device in an event of an accident;

storing continuously data of a second control device in a volatile memory of the first control device; and re-storing the data of the second control device stored in the volatile memory into the non-volatile memory when the accident is sensed as further accident-relevant data.

Other features which are considered as characteristic for the invention are set forth in the appended claims.

Although the invention is illustrated and described herein as embodied in an occupant protection control system and a method of controlling the occupant protection control system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a diagrammatic, block diagram of an occupant protection control system according to the invention.

DESCRIPTION OF THE PREFERRED EMBODIMENTS

Referring now to the single figure of the drawing in detail, there is shown an occupant protection control system represented as an exemplary embodiment in the figure that has an airbag system with a front airbag system 1 and a side airbag system 8. In the front airbag system 1, the associated control device is preferably disposed centrally in the vehicle, for example on the vehicle tunnel, serves for controlling a triggering of a driver airbag 20 and/or passenger airbag and contains an electronic control unit (processor) 2. The control unit 2 is connected to sensors 6 serving for collision sensing (in particular speed and deceleration sensors). The electronic control unit 2 is further connected via an internal bus system 3 (control, data and address bus) of the front airbag system 1 to a non-volatile memory 4 and to a further memory 5, configured as a circulating memory. The electronic control unit 2 monitors in a known way sensor output signals and, when the signals or signal profiles signaling a collision are sensed, triggers the firing of the airbag 20. Furthermore, when such a collision is detected, the electronic control unit 2 also brings about the storing of the sensor output signals into the non-volatile memory 4 in a known way, so that the data characteristic of the way in which the accident happened, including for a certain period of time before the actual instant of the accident, are permanently stored in the non-volatile memory 4. The non-volatile memory 4 may be a programmable memory, for example as an EEPROM. The memory 5, further provided according to the invention, is configured as a volatile memory, for example as a RAM, and stores continuously (for in each case a certain time period) the crash sensor signals supplied to the side airbag system 8.

The side airbag system 8 has a control device preferably disposed laterally in the vehicle serves for controlling the triggering of the driver and/or passenger side airbag 30 and contains an electronic control unit (processor) 9, which is coupled to crash sensors 11. The crash sensors 11 provide in a known way the information required for controlling the side airbag 30, for example with respect to a side collision. The output signal or signals of the sensor or sensors 11 is or are also passed continuously to the front airbag system 1, via an internal bus 12 (control, data and address bus) of the side airbag system 8 and a line 7 connecting the side airbag system 8 to the front airbag system 1. The line 7 may be a specially provided line or may, for example, also be formed by the already existing connecting lines between the respective airbag systems and a central control device.

The signals continuously emitted by the sensors 11 of the side airbag system 8 during driving operation of the motor vehicle are stored continuously (for in each case a certain time period) in the volatile memory 5 via the bus system 3. The volatile memory 5 consequently stores for each point in time the output signals of the sensors 11 that are current at this point in time and the data registered during a previously fixed time period before this current point in time. For this purpose, the volatile memory 5 may be configured for example as a circulating memory with address advancement in a ring form or be configured in some other way. If the electronic control unit 2 detects an immediately imminent collision or a collision which has already occurred, it stores in the non-volatile memory 4 not only the data characterizing the way in which the accident happened, emitted by its own sensors 6, but also the data contained in the memory 5. The non-volatile memory 4 therefore contains the accident data representative of the same time intervals both of the front airbag system 1 and of the side airbag system 8.

In order that, in the event of an accident in which possibly only the side airbag system 8 triggers the side airbag 30 but the front airbag 20 is not activated, the permanent registration of the data characterizing the side collision nevertheless takes place. In a further development of the invention the electronic control unit 9 may in such a case supply to the electronic control unit 2, for example via the connection lines 7, 12, a signal which signals the (imminent) side collision. On receiving the signal, the control unit 2 controls the re-storage of the data contained in the volatile memory 5 into the non-volatile memory 4. The non-volatile memory 4 may possibly also additionally store the data emitted by the sensors 6 of the front airbag system 1 during the corresponding time interval. In this case, the front airbag system 1 consequently serves as an accident data recorder for the side airbag system 8.

Consequently, a further non-volatile memory is not required in the side airbag system 8. However, it is alternatively also possible to provide the memories 4 and 5 in the side airbag system 8, instead of in the front airbag system 1. In this case the sensor data are then passed from the front airbag system 1 to the side airbag system 8 and registered there in the event of an accident. In this case, the side airbag system 8 assumes the function of the accident data recorder.

The invention is explained above on the basis of two airbag systems 1, 8. The invention can also be used, however, in connection with other occupant protection systems. For example, instead of the side airbag system 8, a belt pre-load control system and/or rollover bar control system may be used, the accident-relevant data of which are then stored in the front airbag system or in some other occupant protection system configured according to block 1.

The invention is configured in particular for use in motor vehicles, but also in vehicles of other types, such as for instance aircraft.

I claim:

1. An occupant protection control system, comprising:
    at least two occupant protection control devices for controlling at least two occupant protection devices disposed in a vehicle, one of said at least two occupant protection control devices having a control unit, a non-volatile memory for permanent storage of accident-related signals in an event of an accident, and a volatile memory, said volatile memory storing data sensed and supplied by the other of said at least two occupant control devices, in the event of the accident, said control unit initiates and controls a re-storage of the data stored in said volatile memory into said non-volatile memory.

2. The occupant protection control system according to claim 1, wherein said volatile memory is a circulating memory.

3. A method of controlling an occupant protection control system having at least two occupant protection control devices, which comprises:

storing accident-relevant data of a first control device in a non-volatile memory of the first control device in an event of an accident;

storing continuously data of a second control device in a volatile memory of the first control device; and re-storing the data of the second control device stored in the volatile memory into the non-volatile memory when the accident is sensed as further accident-relevant data.

* * * * *